United States Patent [19]

Kempter et al.

[11] Patent Number: 4,594,403

[45] Date of Patent: Jun. 10, 1986

[54] PREPARATION OF AMIDE-CONTAINING EPOXIDE/AMINE ADDUCTS

[75] Inventors: Fritz E. Kempter, Mannheim; Günther Sabelus, Lambsheim; Eberhard Schupp, Schwetzingen; Wolfram Weiss, Mutterstadt, all of Fed. Rep. of Germany

[73] Assignee: BASF Aktiengesellschaft, Fed. Rep. of Germany

[21] Appl. No.: 744,206

[22] Filed: Jun. 13, 1985

[51] Int. Cl.$^4$ ............................................. C09D 3/58
[52] U.S. Cl. ................................. 528/113; 523/415; 523/416; 528/363
[58] Field of Search ............... 528/113, 363; 523/415, 523/416

[56] References Cited

U.S. PATENT DOCUMENTS

| 3,947,338 | 3/1976 | Jerabek et al. | 523/415 X |
| 3,947,339 | 3/1976 | Jerabek et al. | |
| 4,134,864 | 1/1979 | Belanger | 528/113 X |
| 4,212,779 | 7/1980 | Schmolzer | |
| 4,315,840 | 2/1982 | Kempter | |

*Primary Examiner*—Earl Nielsen
*Attorney, Agent, or Firm*—Keil & Weinkauf

[57] ABSTRACT

Amide-containing epoxy resin/amine adducts are prepared by a process in which an epoxy resin/amine adduct containing primary and/or secondary aminoalkyl groups is reacted with a carboxylic acid in the presence of esterification catalysts, particularly advantageously in the presence of an alcohol.

The products prepared according to the invention are useful as binders for cathodic electrocoating.

7 Claims, No Drawings

PREPARATION OF AMIDE-CONTAINING EPOXIDE/AMINE ADDUCTS

The present invention relates to a process for the preparation of amide-containing epoxide/amine adducts by reacting an epoxy resin/amine adduct containing primary aminoalkyl groups with a carboxylic acid.

The reactioh of epoxy resin/amine adducts with carboxylic acids is a conventional reaction for the preparation of starting materials or intermediates in the production of coating agents, in particular water-soluble and cathodic binders.

For example, reactions of this type are described in German Laid-Open applications DOS 3,008,810, DOS 2,737,375 and DOS 2,914,297, the reaction temperatures stated being 140°–200° C.

However, we have found that the amidation takes place sufficiently rapidly only at 190°–200° C. in the melt. Even at 170° C., 15–20 hours are required for the reaction of an epoxy resin/diamine adduct, as can be prepared, for example, using hexane-1,6-diamine, in order to convert 85–90% of the carboxyl groups.

It is an object of the present invention to provide a process for the preparation of amide-containing epoxide/amine adducts which permits low preparation temperatures and as complete conversion of the carboxylic acids as possible and ensures that the process can be controlled rapidly and readily, for example with regard to the determination of viscosity, until a certain final viscosity is reached within a particular interval.

Surprisingly, we have found that the presence of esterification catalysts in the melt or, particularly effectively, in alcoholic solution permits lower amide formation temperatures.

According to the invention, the accelerated reaction of epoxy resin/amine adducts with carboxylic acids with elimination of water and formation of amide groups is achieved in the presence of esterification catalysts.

We have found that this object is achieved by a process for the preparation of amide-containing epoxy resin/amine adducts by reacting an epoxy resin/amine adduct containing primary and/or secondary aminoalkyl groups with a carboxylic acid, wherein amide formation is carried out in the presence of one or more esterification catalysts.

The esterification catalyst is employed in general in an amount of from 0.1 to 3.0, preferably from 0.5 to 2, per cent by weight, based on the product.

In a particularly preferred embodiment of the novel process, the reaction according to the invention is effected in the presence of an alcohol, either at below the boiling point of the alcohol or, in the case of water-insoluble alcohols, with water being separated off.

A suitable temperature range for the amide formation according to the invention is in general about 140°–180° C., particularly preferably 160°–175° C. The corresponding reaction times are 2–10, preferably 3–6, hours.

Regarding the starting components of the novel preparation process, the following may be stated specifically:

Preferred epoxy resin/amine adducts are products carrying $NH_2$ and NH groups.

Products which contain primary amino groups are described in, for example, U.S. Pat. No. 3,947,339, and are obtained by reacting an epoxy resin with a polyamine in which the primary amino groups are blocked by ketimine groups. When products of this type are used, it is generally necessary for some or all of the ketimine groups to be cleaved hydrolytically before the reaction according to the invention.

Examples of products which possess not only primary amino groups but also secondary amino groups, which carry a secondary OH group in the -position, are the reaction products of epoxy resins with polyamines or diamines, as described in German Laid-Open applications DOS 2,737,375, DOS 2,914,297, DOS 3,008,810 and DOS 2,805,936, German Pat. No. 2,845,988 and German patent application P No. 34 22 473.4.

Other suitable products of this type are the reaction products of epoxy resins with ammonia, such epoxide/amine adducts being described in, for example, German Laid-Open application DOS 2,914,297.

Carboxylic acids which can be used for the novel process are monocarboxylic acids and dicarboxylic acids, and, in minor amounts, even tricarboxylic acids, as occur, for example, as by-products in dimeric fatty acids.

Monocarboxylic acids which are suitable for the novel process are saturated or unsaturated monocarboxylic acids of 2 to 24, preferably 10 to 18, carbon atoms which may furthermore be branched and possess aromatic and cycloaliphatic rings. Specific examples are caprylic acid, caproic acid, stearic acid, linoleic acid and linolenic acid.

Suitable dicarboxylic acids are in general those of 3 to 38, preferably 4 to 36, carbon atoms, for example adipic acid, sebacic acid, nonanoic acid, decanedicarboxylic acid, dimeric fatty acids, such as Pripol ® 1014 (dimerized fatty acid from Unilever) and aromatic or cycloaliphatic dicarboxylic acids, such as phthalic acid and terephthalic acid. Mixtures of the above carboxylic acids may also be used. Dimeric fatty acids are preferred.

The esterification catalysts which catalyze amide formation are used in general in an amount of from 0.1 to 3, preferably from 0.3 to 2.0, % by weight, based on the product. Suitable esterification catalysts are the conventional ones, which may be selected from a large number of available substances. The following may be mentioned, without restricting the choice to particular esterification catalysts: triphenylphosphine, triphenylphosphine oxide, Sn octoate, titanium tetrabutylate, tetraoctyleneglycol titanate, triethanolamine titanate, zinc acetate, lead acetate, dibutyl-tin oxide and dibutyltin dilaurate.

From the class consisting of the acidic catalysts, sulfuric acid and phosphoric acid or derivatives of these, e.g. p-toluenesulfonic acid, can be used according to the invention. For the preferred use of the novel products as binders for cathodic electrocoating, it is however advantageous for these low molecular weight acids, where they cannot be removed in another manner (e.g. by precipitation), to be replaced with, preferably, acids or acid derivatives which can be incorporated completely into the resin molecule, either in a preceding step or in the course of the novel process. Examples are acrylic sulfonic acids, as stated in, for example, European Pat. No. 0,048,362 or Japanese Pat. No. 56,062,856, acrylic phosphoric acid derivatives, as described in Japanese Pat. No. 56,147,817, and vinylsulfonic acid or its esters or sulfonate-containing products, as described in German patent application P No. 34 22 509.9. These substances are generally incorporated by addition at the primary and/or secondary amino groups. Any possible further cleavage takes place at above 180° C. A particularly preferred class of substances, suitable for incorporation into the resin molecule, comprises amidosulfonic acids of the formula (I)

where R is hydrogen or $C_1$-$C_4$-alkyl.

Amidosulfonic acid itself is preferred. This compound is completely incorporated into the product at no later a stage than during amide formation, ammonia being eliminated and the alkylamidosulfonate of the epoxy resin/amine adducts being formed. It is of course also possible to combine the esterification catalysts within the process according to the invention. For example, amidosulfonic acid can advantageously be combined with triphenylphosphine.

The use of esterification catalysts in the amide-forming reaction of epoxy resin/amine adducts with carboxylic acids substantially accelerates the reaction.

A further improvement in the reaction rate is observed when the reaction is carried out in the presence of an alcohol. Preferably used alcohols are high-boiling alcohols, such as benzyl alcohol, 4-methylbenzyl alcohol, 2-phenylpropan-1-ol, 2-ethylhexan-1-ol, iso-4-methylbenzyl alcohol, iso-nonanol, isodecanol, cyclohexanol, 4-tert.-butylcyclohexanol and the ® Alfols (mixture of $C_1$-$C_{15}$-alcohols), and glycol ethers, such as butylglycol, butyldiglycol, hexylglycol, ethyldiglycol, cyclohexylglycol and monophenylglycol. The novel preparation process is generally carried out at below the boiling point of the alcohol when it is intended to avoid loss of alcohol. Carrying out the novel process in alcoholic solution simplifies control of the process, for example with regard to the determination of viscosity until a certain final viscosity is reached within a particular interval. Preferred alcohols are benzyl alcohol and 4-methylbenzyl alcohol.

Depending on the crosslinking agent used, the esterification catalysts employed according to the invention can also catalyze curing of the coatings produced using the amide-containing resins, for example acid catalysis in the case of aminoplast and phenoplast resins (cf. German patent application P No. 34 22 509.9). The use of triphenylphosphine affects the lightness of the coatings; high-boiling alcohols are effective leveling agents, and glycol ethers can be used as catalyst solvents.

The products prepared by the novel process are useful as surface coating binders, in particular as binders for cathodic electrocoating.

In the Examples, parts and percentages are by weight, unless stated otherwise.

PREPARATION OF AN EPOXY RESIN/AMINE ADDUCT 1,920.0 parts of a diglycidyl ether obtained from epichlorohydrin and bisphenol A and having an epoxide value of 0.5 are dissolved in 480 parts of toluene at about 70° C. 2,000.0 parts of this solution are added dropwise to 1,485.0 parts of hexamethylenediamine in the course of 2.5 hours at 70° C. This solution is freed from the solvent and excess amine in a thin film evaporator at 150° C. and then at 190° C. under 0.3 mm Hg. The pale resin has a softening point of 69° C. and an acid number of 2.0 mg of KOH/g. Analysis gave a total content of basic nitrogen of 4.2%, 2.0% of this being attributable to primary amino groups, 2.1% to secondary amino groups and 0.1% to tertiary amino groups.

COMPARATIVE EXAMPLE 1

27.8 parts of a dimeric fatty acid (e.g. Pripol 1014) and 9.0 parts of benzoic acid are added to 160.0 parts of the epoxy resin/hexamethylenediamine adduct described above, and the mixture is reacted at 170° C. under a gentle stream of nitrogen in a reaction vessel connected to a distillation condenser. After a reaction time of 17 hours, the acid number obtained is 6.5 mg of KOH/g.

COMPARATIVE EXAMPLE 2

The mixture described in Example 1 is mixed with 24.0 parts of isodecanol. After a reaction time of 16 hours at 170° C., the acid number obtained is lower, at 5.2.

EXAMPLE 1

160.0 parts of the epoxy resin/hexamethylenediamine adduct described above are melted at 100°-120° C. An aqueous solution of 1.84 parts of amidosulfonic acid is added to this melt, and virtually the entire amount of water is removed by heating until the temperature reaches 140° C. Thereafter, the mixture is heated to 180° C. and kept at this temperature until virtually no more ammonia escapes. 27.8 parts of a dimeric fatty acid and 9 parts of benzoic acid are then added, and the mixture is reacted at 170° C. After 10 hours, the reaction product has an acid number of 10 mg of KOH/g, which cannot be reduced even on further heating. (The calculated acid number of the product is 6 mg of KOH/g, based on sulfonate groups.)

EXAMPLE 2

The reaction described in Example 1 is carried out in the presence of 24.0 parts of isodecanol. The product obtained in this manner has an acid number of 11 mg of KOH/g after a reaction time of 6 hours. (The calculated acid number of the product is 6 mg of KOH/g, based on sulfonate groups.)

EXAMPLE 3

160.0 parts of the epoxy resin/hexamethylenediamine adduct described above are melted with 27.8 parts of a dimeric fatty acid and 9.0 parts of benzoic acid. 1.96 g of titanium tetrabutylate dissolved in 24.0 parts of isodecanol are metered in over 5 minutes at 130°-140° C., and the mixture is stirred at 170° C. for 5 hours, after which it has an acid number of 3 mg of KOH/g.

EXAMPLE 4

The reaction described in Example 3 is carried out in the presence of 1.96 parts of triphenylphosphine. After the mixture has been stirred for 8 hours at 170° C., the resulting acid number is 7 mg of KOH/g.

EXAMPLE 5

160.0 parts of the epoxy resin/hexamethylenediamine adduct described above are melted with 27.8 parts of a dimeric fatty acid and 9.0 parts of benzoic acid, as well as 24.0 parts of isodecanol, 12 parts of hexylglycol and 3.0 parts of triphenylphosphine.

1.84 parts of amidosulfonic acid dissolved in a little water are added at 100°-120° C., and the mixture is slowly heated to 140° C. in order to remove the water.

Vigorous evolution of ammonia begins from 140° C. and reaches a maximum at 160°–170° C.

After a reaction time of 5 hours at 170° C., the resulting acid number is 8.5 mg of KOH/g. The calculated acid number of the product is 6 mg of KOH/g, based on sulfonate groups.

EXAMPLE 6

The mixture used is the same as that described in Example 4, except that 32.0 parts of benzyl alcohol are present and the amount of triphenylphosphine used is 3.0 parts. After a reaction time of 5 hours at 170° C., the resulting acid number is 2.7 mg of KOH/g.

We claim:

1. A process for the preparation of an amide-containing epoxy resin/amine adduct by reacting an epoxy resin/amine adduct containing primary or secondary aminoalkyl groups or primary and secondary aminoalkyl groups with a carboxylic acid, wherein amide formation is carried out in the presence of one or more esterification catalysts.

2. A process as claimed in claim 1, wherein amide formation is carried out in the presence of one or more alcohols at below the boiling point of the alcohol.

3. A process as claimed in claim 1, wherein the esterification catalyst is a sulfonate group, which is present in the epoxy resin/amine adduct, or is incorporated during the reaction, in an amount of 0.1–0.3%.

4. A process as claimed in claim 2, wherein the esterification catalyst is a sulfonate group, which is present in the epoxy resin/amine adduct, or is incorporated during the reaction, in an amount of 0.1–0.3%.

5. A process as claimed in claim 3, wherein the sulfonate-donating compound is amidosulfonic acid.

6. A process as claimed in claim 1, wherein the esterification catalyst used is triphenylphosphine or titanium tetrabutylate or a mixture of these, in an amount of 0.1–3.0%.

7. A process as claimed in claim 2, wherein the esterification catalyst used is triphenylphosphine or titanium tetrabutylate or a mixture of these, in an amount of 0.1–3.0%.

* * * * *

UNITED STATES PATENT AND TRADEMARK OFFICE
CERTIFICATE OF CORRECTION

PATENT NO. : 4,594,403
DATED : June 10, 1986
INVENTOR(S) : Fritz Erdmann KEMPTER et al.

It is certified that error appears in the above-identified patent and that said Letters Patent is hereby corrected as shown below:

Please insert the following:

-- [30] FOREIGN APPLICATION PRIORITY DATA

June 16, 1984 [DE] Fed. Rep. of Germany....3422472 --

Signed and Sealed this

Twenty-fifth Day of November, 1986

*Attest:*

DONALD J. QUIGG

*Attesting Officer*      *Commissioner of Patents and Trademarks*